United States Patent
Song (10) Patent No.: US 10,327,391 B2
(45) Date of Patent: Jun. 25, 2019

(54) PRUNING SHEARS HAVING BOTH TREE BRANCH HANGER AND SHOCK-ABSORBING FUNCTIONS

(71) Applicant: Jinchul Song, Gumi-si (KR)

(72) Inventor: Jinchul Song, Gumi-si (KR)

( * ) Notice: Subject to any disclaimer, the term of this patent is extended or adjusted under 35 U.S.C. 154(b) by 0 days.

(21) Appl. No.: 15/742,197

(22) PCT Filed: Jan. 5, 2017

(86) PCT No.: PCT/KR2017/000124
§ 371 (c)(1),
(2) Date: Jan. 5, 2018

(87) PCT Pub. No.: WO2017/150799
PCT Pub. Date: Sep. 8, 2017

(65) Prior Publication Data
US 2018/0192593 A1    Jul. 12, 2018

(30) Foreign Application Priority Data
Mar. 4, 2016   (KR) .................. 10-2016-0026655

(51) Int. Cl.
*A01G 3/02* (2006.01)
*A01G 3/08* (2006.01)
*B25G 1/01* (2006.01)

(52) U.S. Cl.
CPC ............ *A01G 3/02* (2013.01); *A01G 3/08* (2013.01); *A01G 3/083* (2013.01); *B25G 1/01* (2013.01); *A01G 2003/023* (2013.01)

(58) Field of Classification Search
CPC . A01G 3/02; A01G 3/08; A01G 3/083; A01G 2003/023; B25G 1/01
See application file for complete search history.

(56) References Cited

U.S. PATENT DOCUMENTS

| 2015/0217462 | A1* | 8/2015 | Cotter ..................... B26B 13/22 30/123 |
| 2016/0150737 | A1* | 6/2016 | Poehlmann ............ A01G 3/083 30/143 |
| 2018/0132424 | A1* | 5/2018 | Poehlmann .............. A01G 3/02 |
| 2018/0304478 | A1* | 10/2018 | Wada ..................... B26B 13/16 |

FOREIGN PATENT DOCUMENTS

| JP | 2011-206262 A | 10/2011 |
| KR | 10-2010-0062018 A | 6/2010 |
| KR | 20-2010-0012476 U | 12/2010 |
| KR | 10-1557609 B1 | 10/2015 |
| KR | 10-1564930 B1 | 11/2015 |
| KR | 10-1681863 B1 | 12/2016 |

* cited by examiner

*Primary Examiner* — Omar Flores Sanchez
(74) *Attorney, Agent, or Firm* — KORUS Patent, LLC; Seong Il Jeong (57) ABSTRACT

The present invention relates to pruning shears, and is intended to cut off branches and stems of landscape trees, fruit trees, etc. while minimizing slips, etc. occurring during pruning when the branches or stems have large diameters or are stiff, to alleviate impacts applied to a hand of an operator particularly at the moment when thick branches or stems are cut off, and to be conveniently hung on a tree branch during work. Furthermore, the pruning shears have a rotating portable saw accommodation means configured to cut off a tree branch or stem outside the cutting range of the pruning shears.

6 Claims, 9 Drawing Sheets

PRUNING SHEARS HAVING BOTH TREE BRANCH HANGER AND SHOCK-ABSORBING FUNCTIONS

TECHNICAL FIELD

The present invention relates to pruning shears, and more specifically to pruning shears having both tree branch hanger and shock-absorbing functions, which are capable of cutting off branches and stems of landscape trees, fruit trees, etc. while minimizing slips, etc. occurring during pruning when the branches or stems have large diameters or are stiff, which are capable of alleviating impacts applied to a hand of an operator particularly at the moment when thick branches or stems are cut off, and which are capable of being conveniently hung on a tree branch during work.

BACKGROUND ART

In general, pruning shears are used for the purpose of cutting off tree branches, such as branches, stems, etc., or are used for the purpose of pruning in order to perform the uniform production and control of tree branches. Such pruning shears are also called branch shears, tree shears, trimming shears, topiary shears, etc., but the term "pruning shears" is most widely used.

Figure 1:
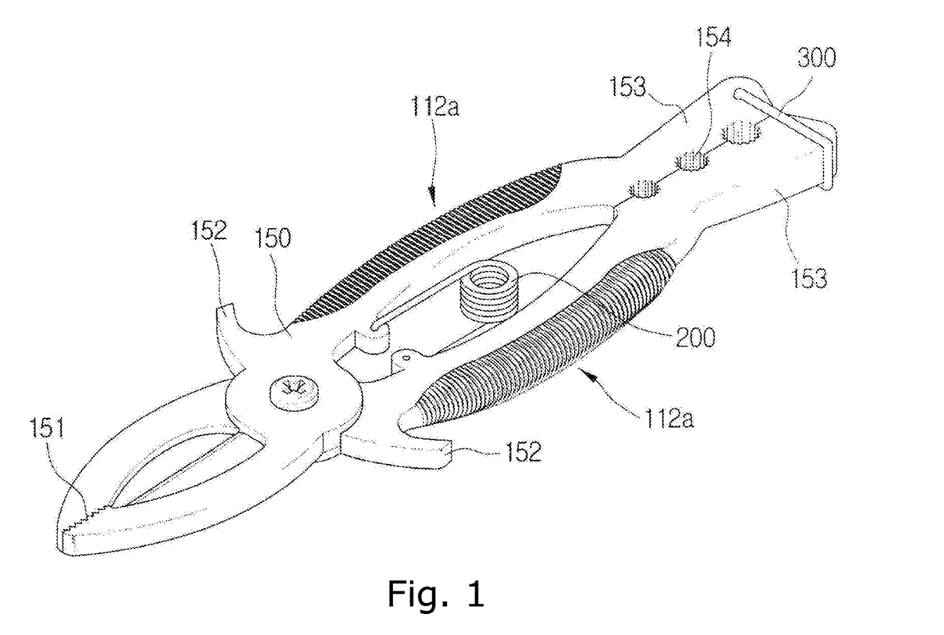
FIG. 1 is a perspective view of a conventional pruning shears.

Korean Utility Model Registration No. 20-0310053 proposed as an example of such pruning shears discloses pruning shears for picking up a stem and lopping off thorns, leaves and twigs present on the stem, the pruning shears including: a pair of shear parts 100 rotatably coupled to each other in a crossed form, each provided with a plurality of through holes 111a formed therethrough, and each integrated with a cutting blade portion 111 and a grip portion 112; shear part support members 150 each formed by being applied from the outside end of the grip portion 112 of each of the shear parts 100 to the edge of the cutting blade portion 111 in a lengthwise direction, and configured to support the shear parts 100; and tongs 151 each configured to extend outward from the outside end of the cutting blade portion 111 of each of the shear part support members 150, and configured to pick up a stem of garden product.

However, according to the structure of the conventional pruning shears, the blade surface of the support blade is configured in the form of a concave surface and the blade surface of the cutting blade is configured in the form of a convex surface, and thus a problem arises in that a cutting-target tree branch or stem inserted between the surface blade and the cutting blade is not effectively cut off. Furthermore, due to the employment of the conventional support blade and the conventional cutting blade, when a tree branch or stem to be cut off is thick, removal to the outside occurs if force adapted to uniformly cut off a stem in the form of a lever and biased to one side is generated, and thus a problem arises in that it is difficult to perform an effective cutting operation. Furthermore, when the support blade and the cutting blade are blunted due to the use thereof, a problem arises in that cutting is not easily performed due to the phenomenon in which a tree branch inserted between the support blade and the cutting blade slips and is removed to the outside.

Moreover, the conventional pruning shears have only the function of cutting off a branch, and thus problems arise in that separate pruning equipment needs to be used when stems of a cut garden product is pruned away for the purpose of commercialization and in that separate bending equipment, such as pliers, needs to be used when a garden product, such as a rose, is bent.

In particular, a user needs to use the cutting blade while holding it in order to lop off thorns, leaves and twigs. Accordingly, a problem arises in that a user may be injured by the cutting blade in case of carelessness.

Therefore, in order to overcome the above problems, the present applicant disclosed Korean Patent No. 10-1557609, and proposes the present invention in order to improve the pruning shears disclosed in the patent of the present applicant.

DISCLOSURE

Technical Problem

The present invention has been conceived to overcome the above-described problems, and an object of the present invention is to provide pruning shears having both tree branch hanger and shock-absorbing functions, which are capable of cutting off branches and stems of landscape trees, fruit trees, etc. while minimizing slips, etc. occurring during pruning when the branches or stems have large diameters or are stiff, which are capable of alleviating impacts applied to a hand of an operator particularly at the moment when thick branches or stems are cut off, and which are capable of being conveniently hung on a tree branch during work.

Technical Solution

In order to accomplish the above object, the present invention provides pruning shears having both tree branch hanger and shock-absorbing functions, the pruning shears including: a first body (10) configured to include a first cutting portion (11) in which a plurality of first slip prevention depressions (12) configured to prevent a slip during cutting of a tree branch is formed, on one side thereof, and a first grip portion (15) which has a rotating portable saw accommodation means (80) configured to cut off a tree branch or stem outside a cutting range of the pruning shears, on a remaining side thereof; a second body (20) configured to include a second cutting portion (21) which corresponds to the first cutting portion 11 on one side thereof, and a second grip portion (25) which is disposed on a remaining side thereof; a hinge member (30) configured to hinge the first body (10) and the second body (20) to each other so that they can selectively approach each other and are separated from each other; a spring (40) configured to be held on spring holding pins (42) provided on opposite inner surfaces of the first grip portion (15) and the second grip portion (25), and to impart elasticity between the first grip portion (15) and the second grip portion (25); a shock-absorbing member (50) provided on any one of the opposite inner surfaces of the first grip portion (15) and the second grip portion (25), and configured to come into elastic contact with a remaining one of the opposite inner surfaces of the first grip portion (15) and the second grip portion (25) and then absorb an impact applied to a hand of an operator at a moment when the operator grips the first grip portion (15) and the second grip portion (25), presses them inward and cuts off a branch or stem in order to cut off a tree branch; and a rubber elastic hanger member (56) provided on any one of the opposite inner surfaces of the first grip portion (15) and the second grip portion (25), and configured to enable the pruning shears to be hung on a tree branch (2) within a work range of the operator in such a manner as to allow the tree branch (2) to be pushed against it and to be held within a space inside it.

In this case, the rotating portable saw accommodation means (80) may be configured such that an accommodation depression (82) configured to be rotated in a direction outside the first grip portion (15) is formed, such that a hinge pin (84) configured to be fitted into a saw (81) so that the saw (81) can be rotated is provided on a lower side of the accommodation depression (82), such that a stop concave depression (85) is formed below one side of the hinge pin (84), such that rotation adjustment members (86) configured to be struck in a stop hole (88) for selective fastening and removal of the saw (81) is provided on a side opposite to the stop concave depression (85), and such that a rotation grip (87) is formed on an outside portion of the saw (81) adjacent to the rotation adjustment members (86).

Furthermore, a stop depression (14) may be formed in the first cutting portion (11) and an opening and closing lever (60) configured to be struck in the stop depression (14) through rotation may be further provided on the second cutting portion (21) so that rotation can be stopped in a state in which the first grip portion (15) and the second grip portion (25) have been pressed inward through gripping.

In this case, the elastic hanger member (56) may be integrated with the shock-absorbing member (50) and any one of the grip portions (15 and 25) provided with the shock-absorbing member (50).

Advantageous Effects

According to the present invention, there are achieved the effect of cutting off branches and stems of landscape trees, fruit trees, etc. while minimizing slips, etc. occurring during pruning when the branches or stems have large diameters or are stiff and the effect of alleviating impacts applied to a hand of an operator particularly at the moment when thick branches or stems are cut off.

Furthermore, there are achieved the effect of easily cutting tree branches by means of the slip prevention depressions provided in the cutting portion even when the cutting portion of the pruning shears becomes old and blunt, the effect of preventing movement to the outside by means of the slip prevention depressions even when tree branches or stems are thick, thereby enabling effective cutting work, and the effect of easily and conveniently ensuring the additional function of accommodating the saw, spreading the saw, accommodated inside the pruning shears, to the outside during required work, and re-accommodating the saw after use, which is beyond the function of the conventional pruning shears of cutting off branches, thereby providing marketability superior to that of other products.

Furthermore, there is achieved the effect of improving work efficiency because, although an operator needs to have a belt equipped with a pocket for pruning shears in order to hang pruning shears, the pruning shears can be hung on a tree branch by means of the elastic hanger member when a ladder is moved in a lateral direction or another piece of work is performed during work.

MODE FOR INVENTION

Details for the practice of the present invention will be described in greater detail below with reference to the accompanying drawings.

The present invention relates to pruning shears having both tree branch hanger and shock-absorbing functions, which is capable of cutting off branches and stems of landscape trees, fruit trees, etc. while minimizing slips, etc. occurring during pruning when the branches or stems have large diameters or are stiff, which is capable of alleviating impacts applied to a hand of an operator particularly at the moment when thick branches or stems are cut off, and which is capable of being conveniently hung on a tree branch during work. Referring to FIGS. 2 to 9, the pruning shears are configured to include a first body 10, a second body 20, a hinge member 30, a spring 40, a shock-absorbing member 50, and an elastic hanger member 56.

Figure 2:
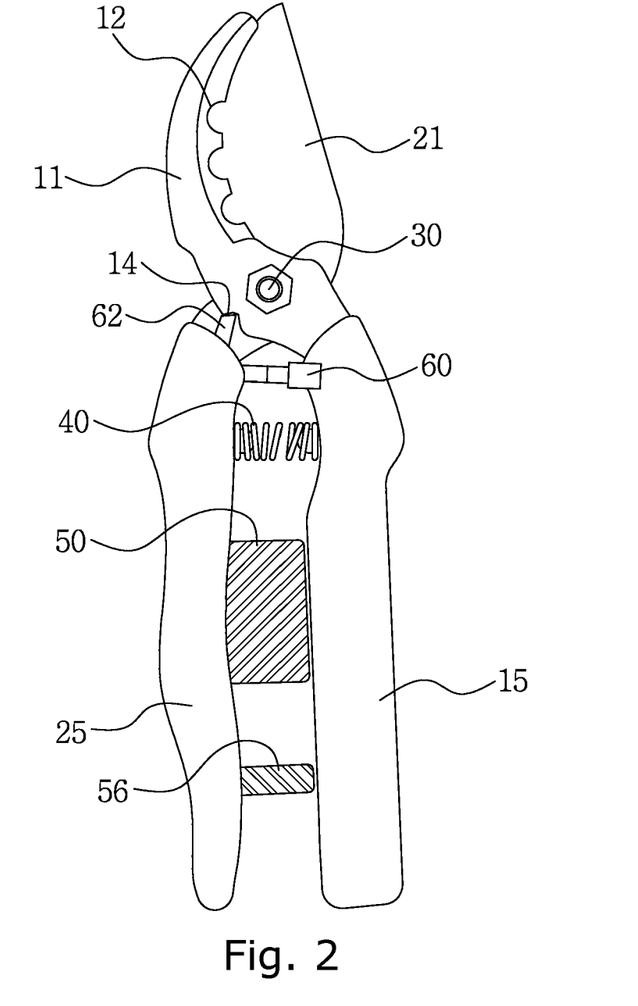
FIGS. 2 and 3 are views showing an example of pruning shears having both tree branch hanger and shock-absorbing functions according to the present invention.
Figure 3:
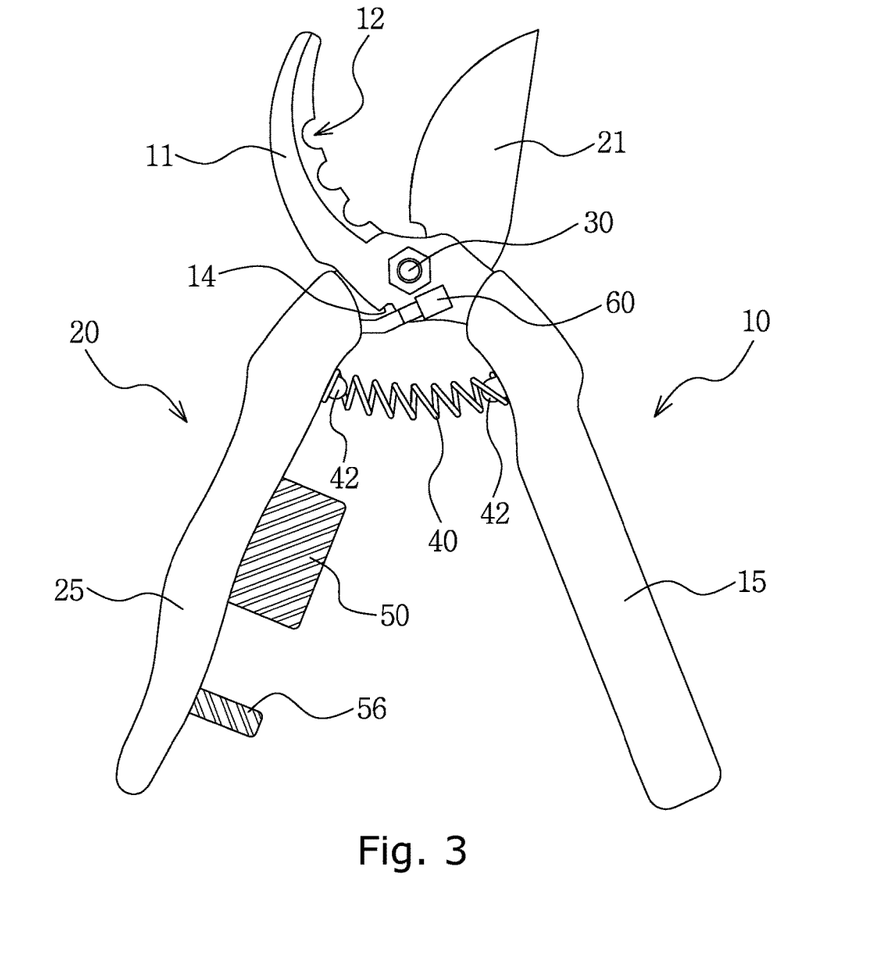

As shown in FIGS. 2 and 3, the first body 10 includes: a first cutting portion 11 in which a plurality of first slip prevention depressions 12 configured to prevent a slip during the cutting of a tree branch is formed, on one side thereof; and a first grip portion 15 which has a rotating portable saw accommodation means 80 configured to cut off a tree branch or stem outside the cutting range of the pruning shears, on the other side thereof.

Figure 4:
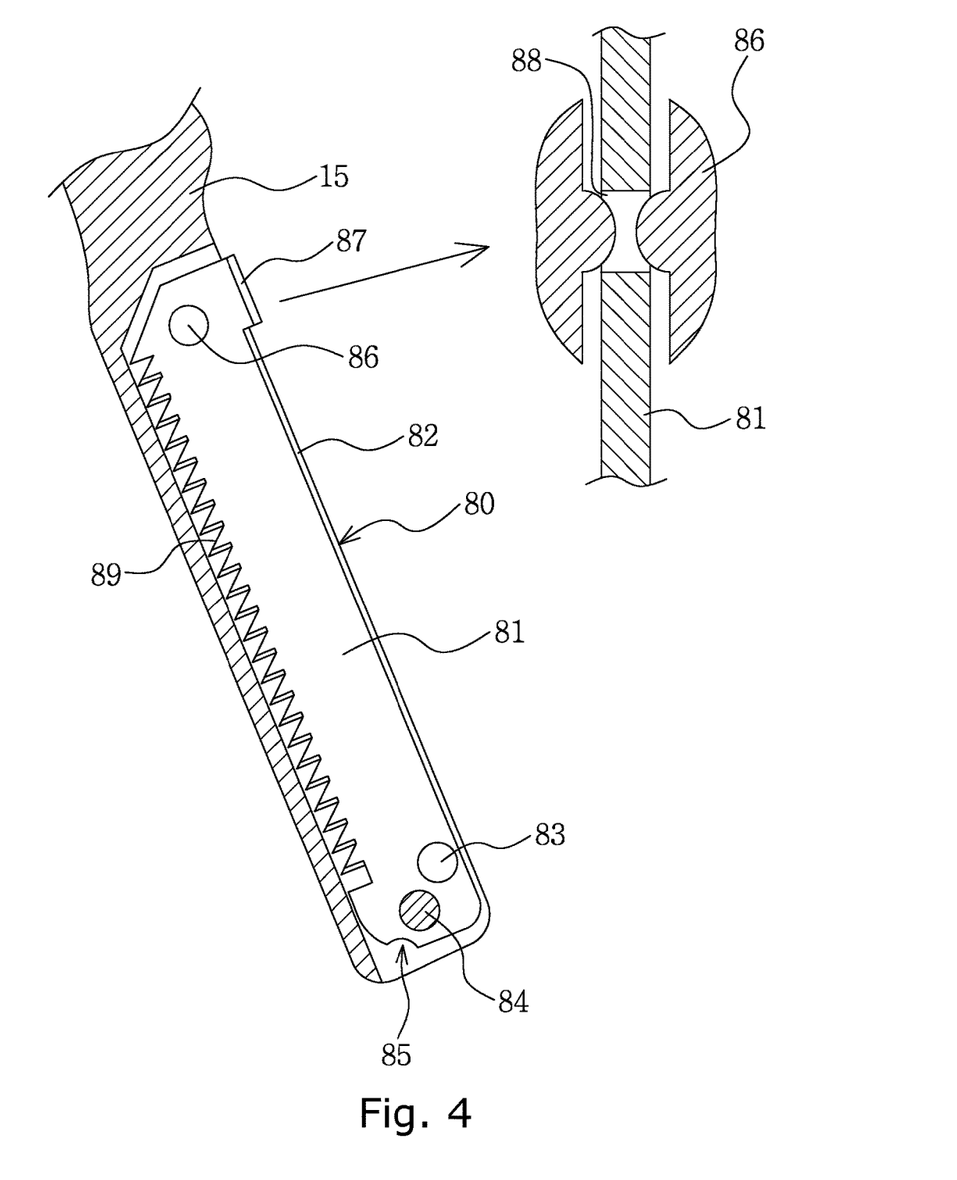
FIGS. 4 and 5 are views showing an example of the rotating portable saw accommodation means of the pruning shears according to the present invention.
Figure 5:
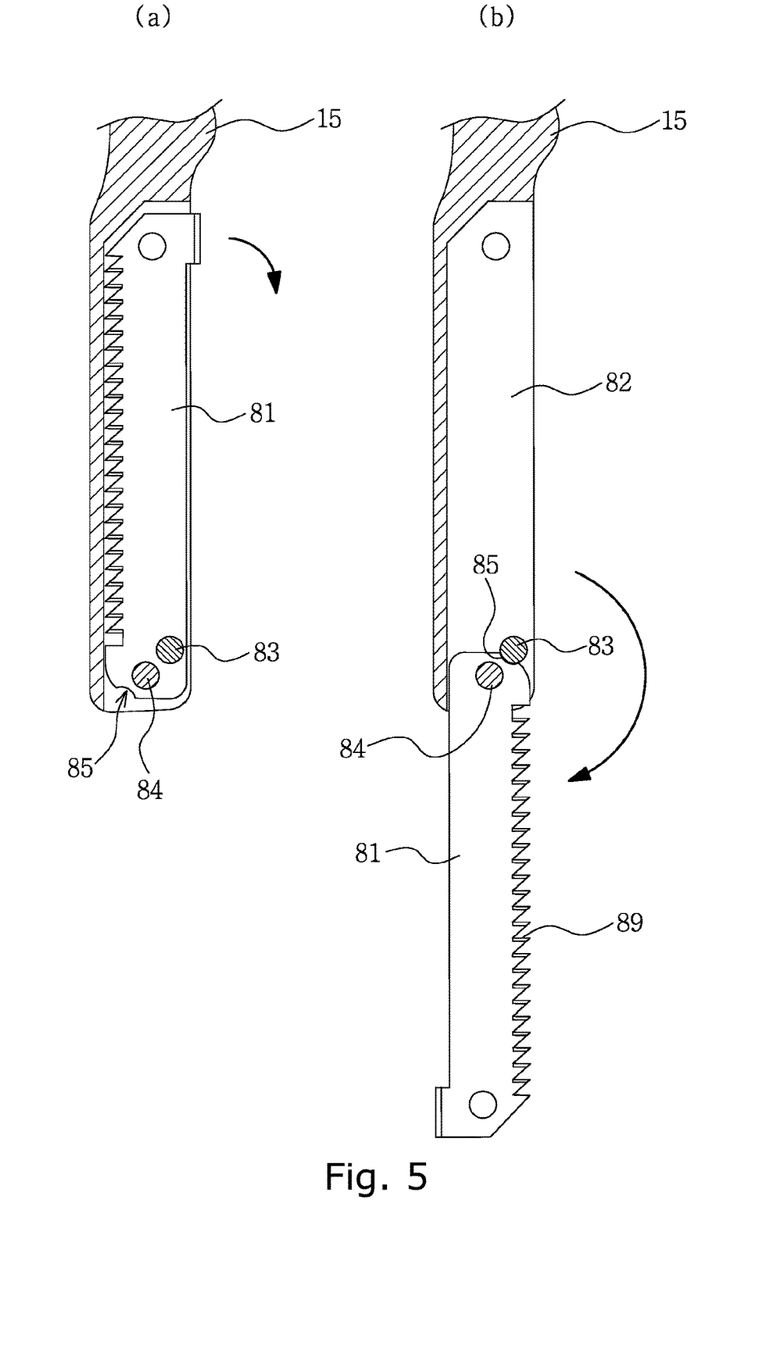

As shown in FIGS. 4 and 5, the rotating portable saw accommodation means 80 formed in the first grip portion 15 is configured such that an accommodation depression 82 configured to be rotated in a direction outside the first grip portion 15 is formed, such that a hinge pin 84 configured to be fitted into a saw 81 so that the saw 81 can be rotated is provided on the lower side of the accommodation depression 82, such that a stop concave depression 85 is formed below one side of the hinge pin 84, such that rotation adjustment members 86 configured to be struck in a stop hole 88 for the selective fastening and removal of the saw 81 is provided on a side opposite to the stop concave depression 85, and such that a rotation grip 87 is formed on an outside portion of the saw 81 adjacent to the rotation adjustment members 86.

As shown in FIGS. 2 and 3, the second body 20 coupled to the first body 10 and configured to be rotated relative to the first body 10 includes: a second cutting portion 21 which corresponds to the first cutting portion 11 on one side thereof; and a second grip portion 25 which is disposed on the other side thereof.

Figure 6:
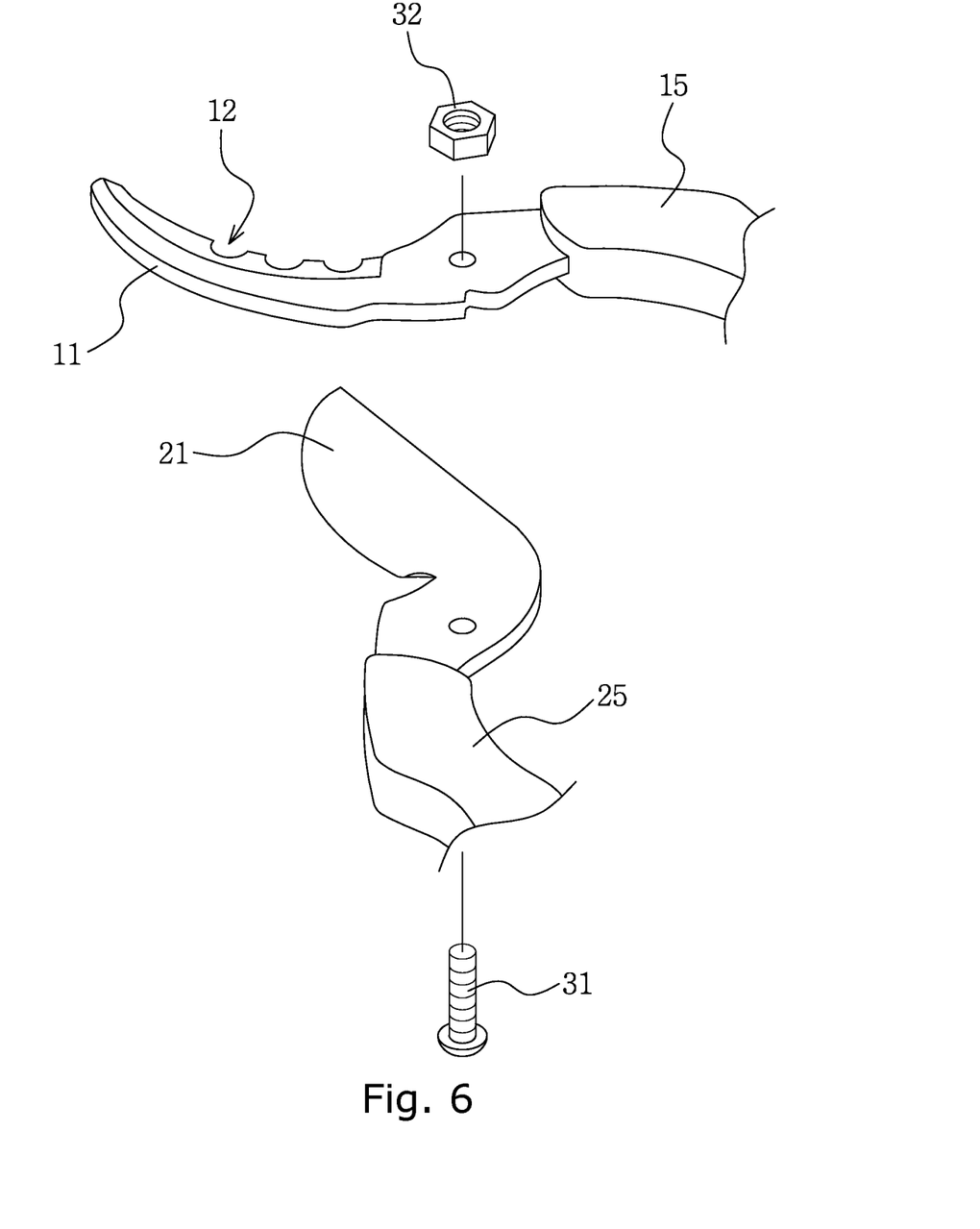
FIG. 6 a view showing an example of the assembly state of the pruning shears according to the present invention.

As shown in FIGS. 2 and 3, there is provided a hinge member 30 configured to hinge the first body 10 and the second body 20 to each other so that they can selectively approach each other and are separated from each other. In this case, the hinge member 30 is achieved through the combination of a bolt 31 and a nut 32 as an example, as shown in FIG. 6.

A spring 40 is provided between the first grip portion 15 and the second grip portion 25 constituting part of the pruning shears of the present invention in order to enable elastic operation therebetween. As shown in FIG. 3, the spring 40 is held on spring holding pins 42 provided on the opposite inner surfaces of the first grip portion 15 and the second grip portion 25.

Furthermore, as shown in FIGS. 2 and 3, a shock-absorbing member 50 is provided on any one of the opposite inner surfaces of the first grip portion 15 and the second grip portion 25, and comes into elastic contact with the other one of the opposite inner surfaces of the first grip portion 15 and the second grip portion 25 and then absorbs an impact applied to a hand of an operator at the moment when the operator grips the first grip portion 15 and the second grip portion 25, presses them inward and cuts off a branch or stem in order to cut off a tree branch.

Although an absorbing action is performed by the spring 40, this absorbs an impact applied to only part of fingers, and thus the effect thereof is insufficient. Accordingly, in the present invention, the shock-absorbing member 50 is provided, and thus an impact applied to the overall fingers is absorbed or alleviated by absorbing or distributing the impact when an operator grips the first grip portion 15 and the second grip portion 25 and presses them inward.

Rubber having elasticity, particularly vibration-proof rubber or the like, is used as the shock-absorbing member 50. The number of pieces of rubber does not matter. Although the shock-absorbing member 50 may be formed throughout any one of the opposite inner surfaces of the first grip portion 15 and the second grip portion 25, it is preferable to form the shock-absorbing member 50 within the range of ¼ to ½ of the overall length of any one of the inner surfaces.

Meanwhile, as shown in FIGS. 2 and 3, a stop depression 14 is formed in the first cutting portion 11 and an opening and closing lever 60 configured to be struck in the stop depression 14 through rotation is further provided on the second cutting portion 21 so that rotation can be stopped in the state in which the first grip portion 15 and the second grip portion 25 have been pressed inward through gripping.

Figure 7:
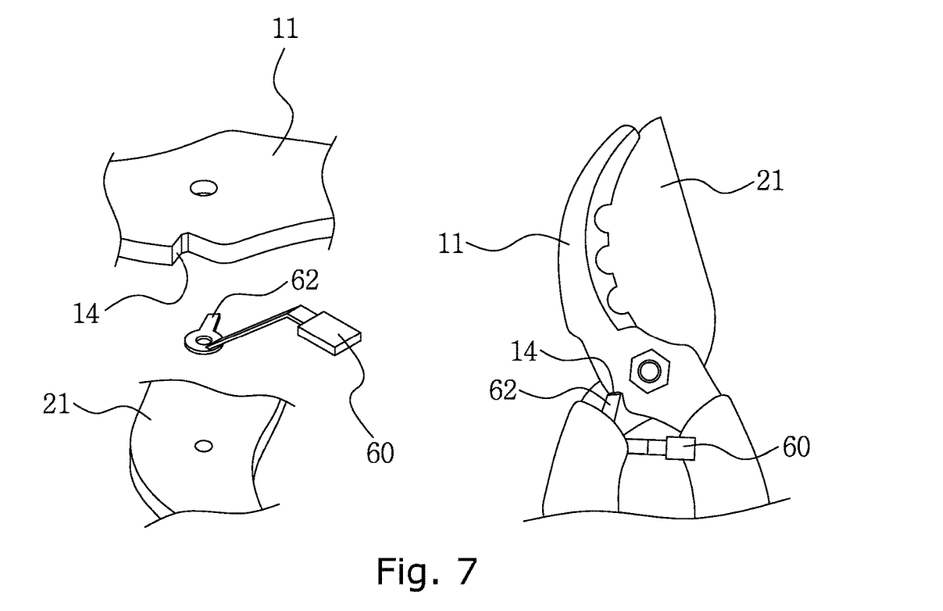
FIG. 7 is a view showing an example of the opening and closing lever of the pruning shears according to the present invention.

The opening and closing lever 60 is shown in FIG. 7 in greater detail. Rotation may be stopped in such a manner that a latch 62 formed at one end of the opening and closing lever 60 is struck in the stop depression 14 formed in the first cutting portion 11 while being rotated. In contrast, the first grip portion 15 and the second grip portion 25 are elastically rotated by the spring 40 in such a manner that the latch 62 is released from the stop depression 14.

Figure 8:
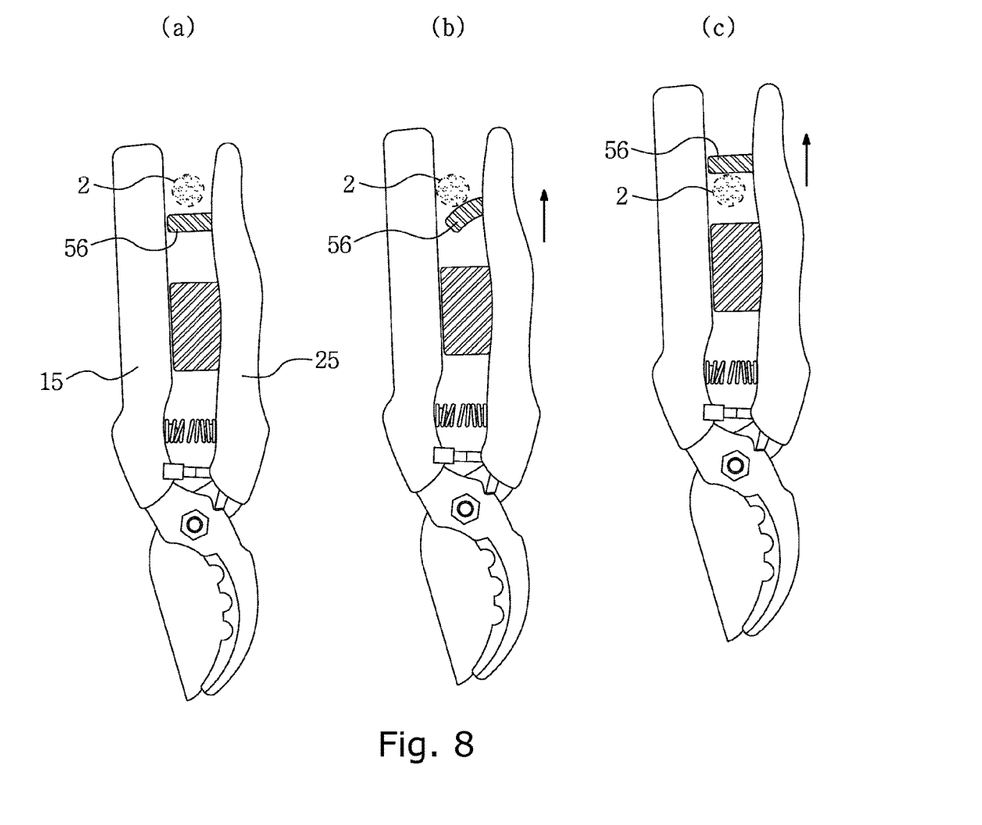
FIGS. 8 and 9 are views showing examples of the elastic hanger member of the pruning shears according to the present invention.

Meanwhile, as shown in FIG. 8, the pruning shears according to the present invention is implemented to have a tree branch hanger function. When an operator moves a ladder in a lateral direction or performs another piece of work during work, particularly when an operator applies an antiseptic after cutting off a tree branch or performs similar work, a hanger for the pruning shears is required. Conventionally, an operator hangs the pruning shears on a belt worn on his or her waist. In this case, the operator needs to frequently move his or her arm or body, and thus the fatigue of the operator is rapidly accumulated, thereby reducing work efficiency. In order to prevent this problem, the present invention is implemented such that the pruning shears may be hung on a tree branch adjacent to the work range of the operator.

For this purpose, an elastic hanger member 56 configured such that a tree branch 2 is pushed against it and held by it is formed on any one of the end portions of the opposite inner surfaces of the first grip portion 15 and the second grip portion 25.

In greater detail, as shown in FIG. 8(a), when rotation is stopped by the stopping operation of the opening and closing lever 60 of the pruning shears in the state in which the first grip portion 15 and the second grip portion 25 have been gripped and pressed inward, the tree branch 2 is inserted between the first grip portion 15 and the second grip portion 25 and brought into contact with the elastic hanger member 56. In this case, as shown in FIG. 8(b), when the elastic hanger member 56 of the pruning shears is pushed in the direction of the tree branch 2, the tree branch 2 pushes the elastic hanger member 56, and simultaneously the elastic hanger member 56 is bent in the direction of force. Accordingly, as shown in FIG. 8(c), the tree branch 2 enters a space inside the elastic hanger member 56, and thus the elastic hanger member 56 can be hung on the tree branch 2.

When the elastic hanger member 56 is employed, the pruning shears may be hung on any tree branch 2 regardless of the thickness of the tree branch 2.

Figure 9:
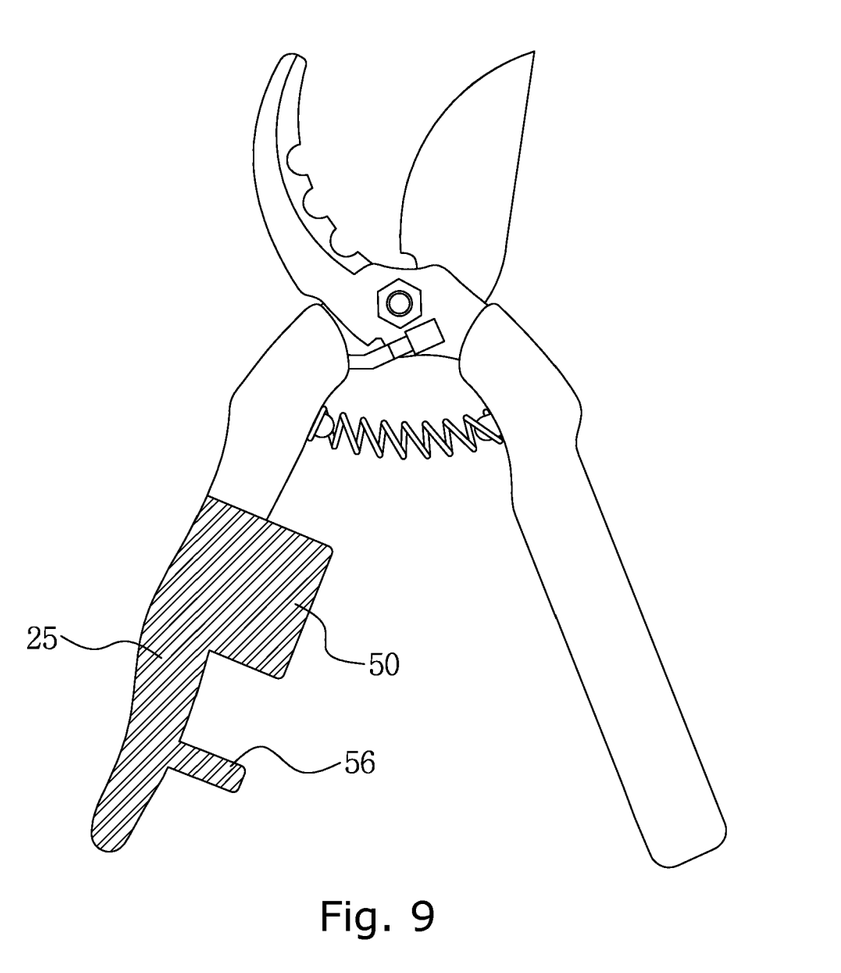

Furthermore, the elastic hanger member 56 is an elastic member. The elastic hanger member 56 is made of the same material, such as rubber, particularly vibration-proof rubber or the like, as the shock-absorbing member 50. For ease of manufacture, as shown in FIG. 9, the elastic hanger member 56 may be integrated with the shock-absorbing member 50 and any one of the grip portions 15 and 25 provided with the shock-absorbing member 50.

When the pruning shears having both tree branch hanger and shock-absorbing functions according to the present invention are configured as described above, it may be possible to cut off branches and stems of landscape trees, fruit trees, etc. while minimizing slips, etc. occurring during pruning when the branches or stems have large diameters or are stiff, to alleviate impacts applied to a hand of an operator particularly at the moment when thick branches or stems are cut off, and to be conveniently hung on a tree branch during work.

2: tree branch
10: first body
11: first cutting portion
12: first slip prevention depression
15: first grip portion
20: second body
21: second cutting portion
25: second grip portion
30: hinge member
40: spring
42: spring holding pin
50: shock-absorbing member
60: opening and closing lever

The invention claimed is:

1. Pruning shears having both tree branch hanger and shock-absorbing functions, the pruning shears comprising:
 a first body (10) configured to include a first cutting portion (11) in which a plurality of first slip prevention depressions (12) configured to prevent a slip during cutting of a tree branch is formed, on one side of the first body (10), and a first grip portion (15) which has a rotating portable saw accommodation means (80) configured to cut off a tree branch or stem outside a cutting range of the pruning shears, on a remaining side thereof;
 a second body (20) configured to include a second cutting portion (21) which corresponds to the first cutting portion 11 on one side of the second body (20), and a second grip portion (25) which is disposed on a remaining side thereof;

a hinge member (30) configured to hinge the first body (10) and the second body (20) to each other so that they can selectively approach each other and are separated from each other;

a spring (40) configured to be held on spring holding pins (42) provided on inner surfaces of the first grip portion (15) and the second grip portion (25), and to impart elasticity between the first grip portion (15) and the second grip portion (25);

a shock-absorbing member (50) provided on any one of the inner surfaces of the first grip portion (15) and the second grip portion (25), and configured to come into elastic contact with a remaining one of the inner surfaces of the first grip portion (15) and the second grip portion (25) and then absorb an impact applied to a hand of an operator at a moment when the operator grips the first grip portion (15) and the second grip portion (25), presses them inward and cuts off a branch or stem in order to cut off a tree branch; and a rubber elastic hanger member (56) provided on any one of the inner surfaces of the first grip portion (15) and the second grip portion (25), and configured to enable the pruning shears to be hung on a tree branch (2) within a working radius of the operator in such a manner as to allow the tree branch (2) to be pushed against it and to be held within a space inside it.

2. The pruning shears of claim 1, wherein the rotating portable saw accommodation means (80) is configured such that an accommodation depression (82) configured to be rotated in a direction outside the first grip portion (15) is formed, such that a hinge pin (84) configured to be fitted into a saw (81) so that the saw (81) can be rotated is provided on a lower side of the accommodation depression (82), such that a stop concave depression (85) is formed below one side of the hinge pin (84), such that rotation adjustment members (86) configured to be struck in a stop hole (88) for selective fastening and removal of the saw (81) is provided on a side opposite to the stop concave depression (85), and such that a rotation grip (87) is formed on an outside portion of the saw (81) adjacent to the rotation adjustment members (86).

3. The pruning shears of claim 1, wherein a stop depression (14) is formed in the first cutting portion (11) and an opening and closing lever (60) configured to be struck in the stop depression (14) through rotation is further provided on the second cutting portion (21) so that rotation can be stopped in a state in which the first grip portion (15) and the second grip portion (25) have been pressed inward through gripping.

4. The pruning shears of claim 2, wherein a stop depression (14) is formed in the first cutting portion (11) and an opening and closing lever (60) configured to be struck in the stop depression (14) through rotation is further provided on the second cutting portion (21) so that rotation can be stopped in a state in which the first grip portion (15) and the second grip portion (25) have been pressed inward through gripping.

5. The pruning shears of claim 1, wherein the elastic hanger member (56) is integrated with the shock-absorbing member (50) and any one of the grip portions (15 and 25) provided with the shock-absorbing member (50).

6. The pruning shears of claim 2, wherein the elastic hanger member (56) is integrated with the shock-absorbing member (50) and any one of the grip portions (15 and 25) provided with the shock-absorbing member (50).

* * * * *